(12) United States Patent
Francis et al.

(10) Patent No.: US 10,596,974 B2
(45) Date of Patent: Mar. 24, 2020

(54) HYDRAULIC PALLET JACK BOX ACTUATION SYSTEM FOR A REFUSE TRUCK AN

(71) Applicant: Brown Industrial, Inc., Botkins, OH (US)

(72) Inventors: Robert Eugene Francis, New Knoxville, OH (US); Craig Donald Brown, Botkins, OH (US); Christopher Donald Brown, Botkins, OH (US)

(73) Assignee: Brown Industrial, Inc., Botkins, OH (US)

(*) Notice: Subject to any disclaimer, the term of this patent is extended or adjusted under 35 U.S.C. 154(b) by 0 days.

(21) Appl. No.: 15/856,356

(22) Filed: Dec. 28, 2017

(65) Prior Publication Data

US 2018/0186297 A1 Jul. 5, 2018

Related U.S. Application Data

(60) Provisional application No. 62/439,920, filed on Dec. 29, 2016.

(51) Int. Cl.
| | | |
|---|---|---|
| *B66F 9/075* | (2006.01) | |
| *B60R 9/02* | (2006.01) | |
| *B62D 65/02* | (2006.01) | |
| *B65F 3/00* | (2006.01) | |
| *B60P 1/64* | (2006.01) | |

(52) U.S. Cl.
CPC .............. *B60R 9/02* (2013.01); *B60P 1/64* (2013.01); *B62D 65/02* (2013.01); *B65F 3/00* (2013.01); *B66F 9/07563* (2013.01)

(58) Field of Classification Search
CPC ...... B62D 27/06; B62D 65/02; B62D 43/002; B60R 9/02; B60R 9/06; B65F 3/00; B66F 9/07563; Y10S 414/13; Y10S 414/917
See application file for complete search history.

(56) References Cited

U.S. PATENT DOCUMENTS

| | | | | |
|---|---|---|---|---|
| 862,963 | A * | 8/1907 | Cretors | B60R 9/02 224/401 |
| 1,864,607 | A * | 6/1932 | Miller | B60R 9/02 224/281 |
| 2,607,518 | A * | 8/1952 | Cohen | B60N 3/002 220/592.2 |

(Continued)

*Primary Examiner* — Gregory W Adams
(74) *Attorney, Agent, or Firm* — Dinsmore & Shohl LLP (57) ABSTRACT

Methods and systems for assembling and using a hydraulic pallet jack box actuation system for a refuse truck are disclosed. The system includes an assembly that supports a pallet jack box sized and configured to contain at least a portion of a pallet jack. The assembly includes a top portion including a linkage connection portion that connects to a cross member of a truck frame, a bottom portion that includes a pallet box support member configured to be raised and lowered between the truck frame and a ground, and a hydraulic cylinder disposed between and connecting the top portion and the bottom portion. The hydraulic cylinder includes a top cylinder portion and a bottom portion configured to extend between an extended position to place the assembly in an extended configuration closer to the ground and a retracted position to place the assembly in a retracted configuration.

13 Claims, 6 Drawing Sheets

(56) References Cited

U.S. PATENT DOCUMENTS

| | | | | |
|---|---|---|---|---|
| 3,149,739 A * | 9/1964 | Brown, Jr. | B60P 1/64 | 182/143 |
| 3,240,408 A * | 3/1966 | Lapansie | B60P 1/56 | 220/23.4 |
| 3,741,604 A * | 6/1973 | Heath | B66F 9/07563 | 180/89.1 |
| 4,049,312 A * | 9/1977 | Rudbeck | B60R 5/00 | 224/401 |
| 4,072,258 A * | 2/1978 | Cruson | B62D 43/002 | 224/42.21 |
| 4,524,676 A * | 6/1985 | Rogers | F15B 15/261 | 91/43 |
| 4,564,134 A * | 1/1986 | Seibert | B60P 3/00 | 224/401 |
| 4,593,786 A * | 6/1986 | Tate | B60K 5/10 | 180/291 |
| 4,772,063 A * | 9/1988 | Amy | B60P 1/00 | 224/401 |
| 4,859,133 A * | 8/1989 | Maria | B66F 9/07563 | 414/462 |
| 4,948,169 A * | 8/1990 | Amundson | B60R 9/02 | 182/88 |
| 5,125,710 A * | 6/1992 | Gianelo | B60R 9/02 | 224/281 |
| 5,280,990 A * | 1/1994 | Rinard | B62D 35/001 | 296/180.1 |
| 5,310,303 A * | 5/1994 | Betts | B62D 27/06 | 224/538 |
| 5,839,760 A * | 11/1998 | Johnson | B60R 9/00 | 280/768 |
| 5,993,133 A * | 11/1999 | Murray | B62D 43/045 | 224/42.12 |
| 7,097,407 B2 * | 8/2006 | Kurohori | B62H 3/00 | 296/37.6 |

\* cited by examiner

HYDRAULIC PALLET JACK BOX ACTUATION SYSTEM FOR A REFUSE TRUCK AN

CROSS REFERENCE TO RELATED APPLICATIONS

The present specification claims priority to U.S. Provisional Patent Application Ser. No. 62/439,920, filed Dec. 29, 2016, the entirety of which is incorporated by reference herein.

TECHNICAL FIELD

The present specification generally relates to a hydraulic actuation system, and, more specifically, to hydraulic pallet jack box actuation systems for refuse trucks and methods of use of such systems.

BACKGROUND

Refuse collection vehicles, such as refuse trucks, are typically designed to collect and haul waste to a solid waste treatment facility. Such refuse trucks may be used, for example, in collecting and transporting animal renderings. The refuse trucks may transport other components, such as pallet jacks, to aid truck operators and refuse workers with their waste transportation duties. However, transporting such components with the refuse trucks can be challenging.

Accordingly, a need exists for alternative systems to transport components on a refuse truck in a reliable and accessible fashion and methods of assembly and use of such systems.

SUMMARY

In one embodiment, a hydraulic pallet jack box actuation system for a refuse truck may include a pallet jack box actuation assembly, and a pallet jack box supported by the pallet jack box actuation assembly and sized and configured to contain at least a portion of a pallet jack. The pallet jack box actuation assembly may include a top portion includes a linkage connection portion that connects to a cross member of a truck frame of the refuse truck, a bottom portion may include a pallet box support member configured to be raised and lowered between the truck frame and a ground on which the refuse truck is positioned, and a hydraulic cylinder disposed between and connecting the top portion and the bottom portion. The hydraulic cylinder may include a top cylinder portion and a bottom portion configured to extend between an extended position to place the pallet jack box actuation assembly in an extended configuration and a retracted position to place the pallet jack box actuation assembly in a retracted configuration. In the extended configuration, the pallet jack box is closer to the ground than in the retracted configuration.

In embodiments, the hydraulic pallet jack box actuation system further may include a plurality of linkage arms disposed between and attaching a top link of the top portion and a bottom link of the bottom portion of the pallet jack box actuation assembly. The top link, the bottom link, and the plurality of linkage arms comprise a linkage assembly. The plurality of linkage arms may rotate in a clockwise direction when the bottom portion moves toward the extended position. The plurality of linkage arms may rotate in a counterclockwise direction when the pallet box support member moves toward the retracted position. The bottom portion of the hydraulic cylinder may be attached at a bottom connection point to the bottom portion of the pallet jack box actuation assembly via a bottom bracket. The top cylinder portion of the hydraulic cylinder may be attached at a top connection point to the cross member of the top portion via a top bracket.

In embodiments, the pallet jack box may include a top wall, a bottom wall, a door, an inner rear end facing wall, an outer rear end facing wall, and a front end facing wall. The inner rear end facing wall may be connected to the outer rear end facing wall through a connecting intermediate wall. The connecting intermediate wall may slope upward between the inner rear end facing wall and the outer rear end facing wall. A space defined between the top wall, the inner rear end facing wall, the outer rear end facing wall, and the connecting intermediate wall may be configured to contain a rotatable arm of the pallet jack to be contained within the pallet jack box. A body of the pallet jack may be configured to be contained in an interior space defined between the inner rear end facing wall, the front end facing wall, the bottom wall, and the top wall. The pallet jack box may include a locking mechanism configured to, in a locking mode, secure edges of the door and edges of the inner rear end facing wall, the outer rear end facing wall, and the connecting intermediate wall such that the pallet jack box is in a closed door position. The locking mechanism may be configured to, in an unlocking mode, release the edges of the door from the edges of the inner rear end facing wall, the outer rear end facing wall, and the connecting intermediate wall to allow the door to pivot away toward the front end facing wall in an opened door position. The hydraulic cylinder may include a mechanical latch and a hydraulic check valve such that the pallet jack box actuation assembly is configured to be secured to the truck frame and spaced from the ground in a raised position and prevented from transitioning to a lowered position when the mechanical latch and the hydraulic check valve are in a locked condition.

In another embodiment, a method of assembling a hydraulic pallet jack box actuation system for a refuse truck may include attaching a top end of a linkage connection portion of a pallet jack box actuation assembly to a cross member of a truck frame of the refuse truck. A bottom link of the linkage connection portion may be configured to be pivotally connected to a first pivot end of each of a plurality of linkage arms. A top portion of the pallet jack box actuation assembly attachable to the cross member may include the linkage connection portion, and the top portion may be configured to be statically fixed in position with respect to the truck frame. The method may further include attaching a top end of a top cylinder portion of a hydraulic cylinder to a top bracket of the cross member. A bottom portion of the hydraulic cylinder may be configured to retract into and extend from the top cylinder portion. The method may further include attaching a bottom end of the bottom portion of the hydraulic cylinder to a bottom bracket of a bottom portion of the pallet jack box actuation assembly. A top link of the bottom portion of the pallet jack box actuation assembly may be configured to be pivotally connected to a second pivot end of each of the plurality of linkage arms. A pallet box support member of the bottom portion of the pallet jack box actuation assembly may be configured to dynamically raise or lower with respect to the top portion of the pallet jack box actuation assembly. In embodiments, the method may further include attaching a pallet jack box configured to contain a pallet jack to the pallet jack box actuation assembly.

In another embodiment, a method of raising and lowering a hydraulic pallet jack box actuation system for a refuse truck may include abutting a bottom link connected to a linkage connection portion of a top portion of a pallet jack box actuation assembly against a top link of a bottom portion of the pallet jack box actuation assembly in a first, raised position. The bottom link and the top link may be part of a linkage assembly. The method may further include spacing the bottom link from the top link of the linkage assembly in a second, lowered position through use of a hydraulic cylinder. The hydraulic cylinder may be configured to connect the top portion to the bottom portion of the pallet jack box actuation assembly and to at least one of dynamically raise and lower the bottom portion with respect to the top portion between the first, raised position and the second, lowered position.

In embodiments, a plurality of linkage arms may be attached between the top link and the bottom link of the linkage assembly to connect the top portion to the bottom portion of the pallet jack box actuation assembly. When the hydraulic cylinder is transitioning between the first, raised position and the second, lowered position, the plurality of linkage arms may rotate in a clockwise direction. When the hydraulic cylinder is transitioning between the second, lowered position and the first, raised position, the plurality of linkage arms may rotate in a counter-clockwise direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Reference will now be made in detail to embodiments of hydraulic pallet jack box actuation systems, examples of which are illustrated in the accompanying drawings. Whenever possible, the same reference numerals will be used throughout the drawings to refer to the same or like parts. Various embodiments of hydraulic pallet jack box actuation systems will be described in further detail herein with specific reference to the appended drawings.

Figure 1:
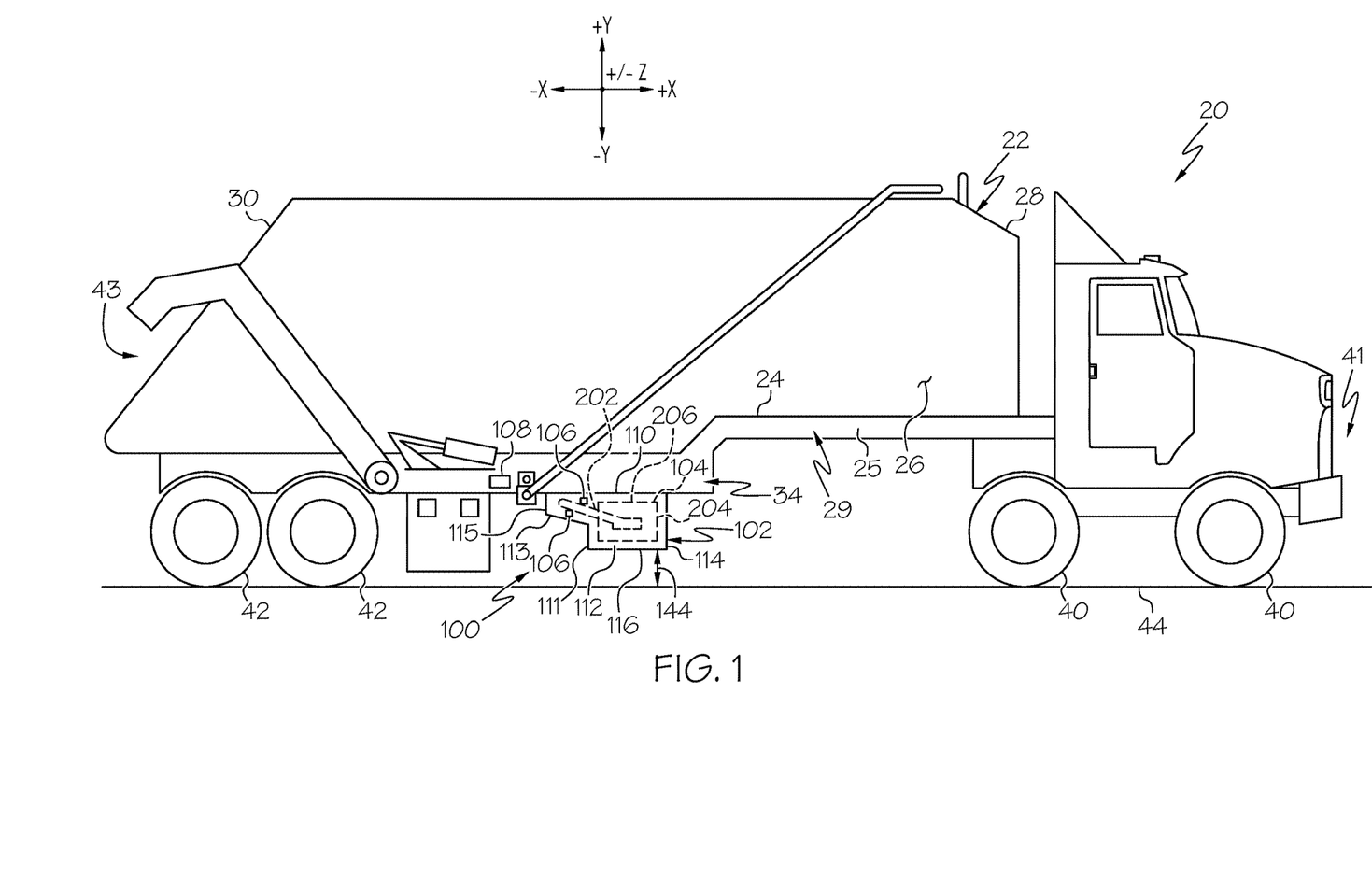
FIG. 1 schematically illustrates a side view of a refuse truck with a hydraulic pallet jack box actuation system in a raised position, according to one or more embodiments shown and described herein.

FIG. 1 generally depicts an embodiment of vehicle that may be, for example, a refuse truck 20. As described herein, a forward-rearward direction of the refuse truck 20 is associated with the +/−vehicle X-direction depicted in FIG. 1. A lateral direction of the refuse truck 20 is associated with the +/−vehicle Z-direction depicted in FIG. 1, and is transverse to the forward-rearward direction. An upward-downward direction of the refuse truck 20 is associated with the +/−vehicle Y-direction depicted in FIG. 1. Further, the terms "inboard," "inward," "inner," "outboard," "outward," and "outer" are used to describe the relative positioning of various components of the refuse truck 20 and of the hydraulic pallet jack box actuation systems described herein.

Referring to FIG. 1, in embodiments, the refuse truck 20 includes a truck bed 22. The truck bed 22 includes a sidewall 26, a front wall 28, and a tailgate 30. The truck bed 22 further includes a floor 24. The floor 24 may be fluid-tight to seal in refuse such as solid waste that is carried within the truck bed 22, and that may be received through an opening on top of the truck bed 22. Further, the floor 24 of the truck bed 22 is supported on a truck frame 34, which includes side-rails 25 extending along both sides of the truck bed 22, and cross members 33 (FIGS. 2-3) extending between and connected to the side-rails 25.

Figure 2:
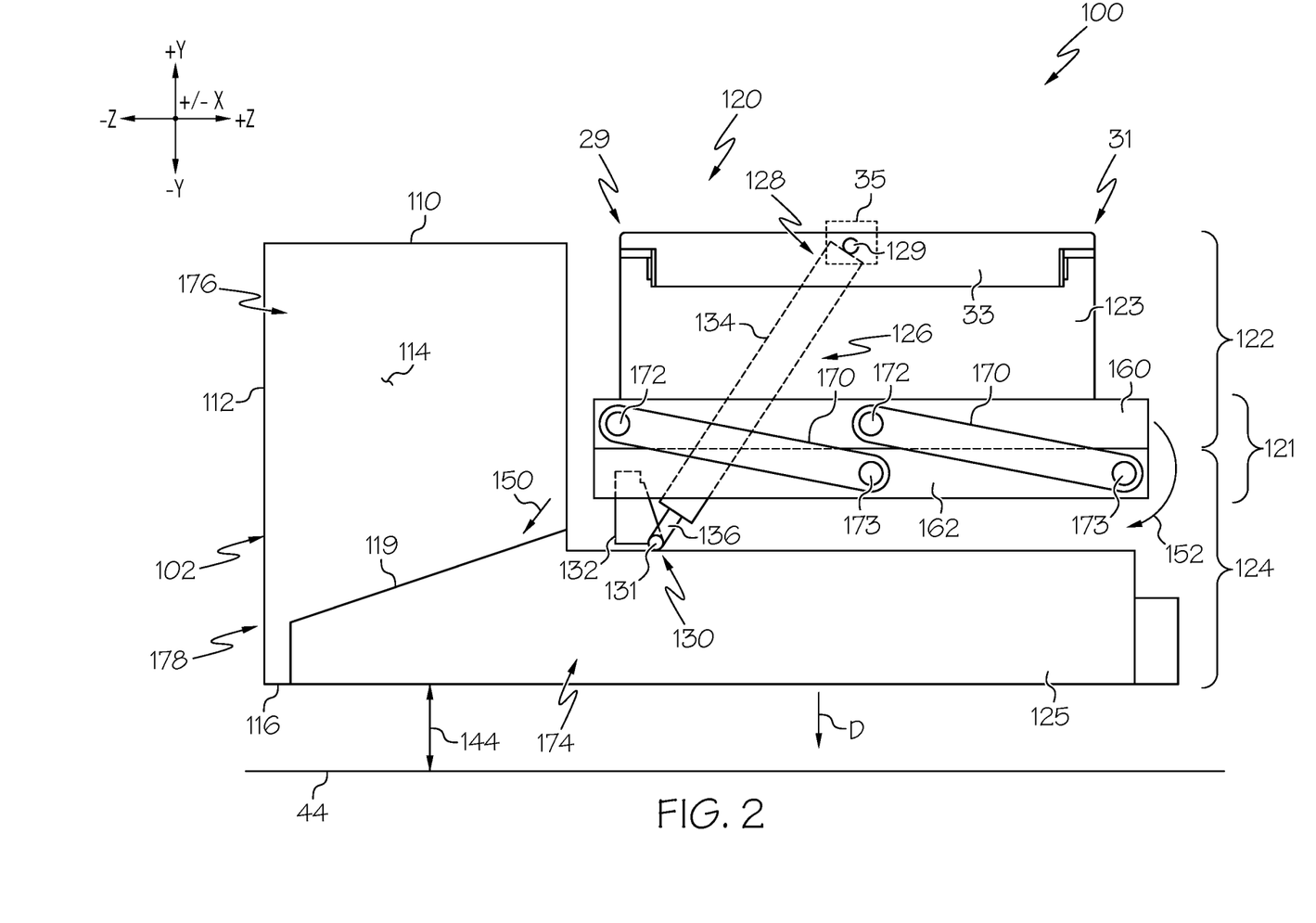
FIG. 2 schematically illustrates a front view of the hydraulic pallet jack box actuation system of FIG. 1 in the raised position, according to one or more embodiments shown and described herein.
Figure 3:
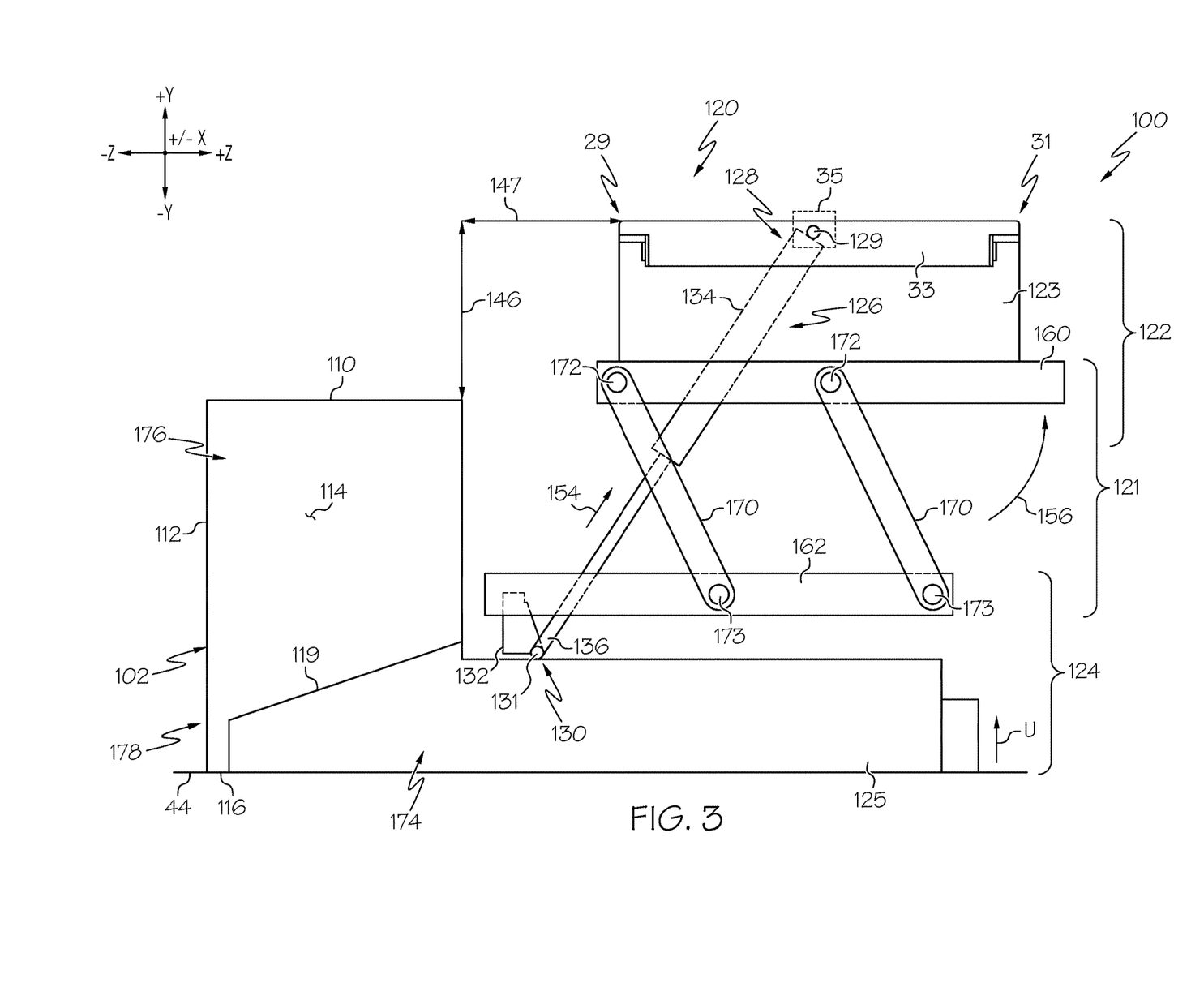
FIG. 3 schematically illustrates the front view of the hydraulic pallet jack box actuation system of FIG. 1 in a lowered position, according to one or more embodiments shown and described herein.

Referring to FIGS. 1-3, a cross member 33 has a left side 29 and a right side 31 when facing from the +X-direction to the −X-direction, which extend from, for example, a front end 41 of the refuse truck 20 to a rear end 43 of the refuse truck 20. The front end 41 of the refuse truck 20 includes a plurality of front wheels 40 configured to drive or rest upon a ground 44. The rear end 43 of the refuse truck 20 includes a plurality of rear wheels 42 configured to drive or rest upon the ground 44. A hydraulic pallet jack box actuation system 100 is disposed between the plurality of front wheels 40 and the plurality of rear wheels 42.

The hydraulic pallet jack box actuation system 100 for the refuse truck 20 includes a pallet jack box actuation assembly 120. The hydraulic pallet jack box actuation system 100 further may include a pallet jack box 102 that is supported by the pallet jack box actuation assembly 120. The pallet jack box 102 is sized and configured to contain at least a portion of a pallet jack 104. In embodiments, the pallet jack box actuation assembly 120 and/or the pallet jack box 102 may be made of stainless steel, aluminum, or like materials such those resistant to rust in an open air and harsh weather condition environments that the refuse trucks 20 will drive through.

Referring to FIGS. 2-3, the pallet jack box actuation assembly 120 includes a top portion 122, a bottom portion 124, and a hydraulic cylinder 126. The top portion 122 includes a linkage connection portion 123 that connects to the cross member 33 of the truck frame 34 of the refuse truck 20. The bottom portion 124 includes a pallet box support member 125 that can be used to support the pallet jack box 102 thereon. For example, the pallet box support member 125 may be connected to the pallet jack box 102 along a connecting region 119 (e.g., by welding and/or fastening). In some embodiments, the pallet box support member 125 may have an internal volume 174 that mates with an internal volume 176 of the pallet jack box 102 to provide a pallet jack holding volume 178. The pallet box support member 125 of the pallet jack box actuation assembly 120 is configured to be raised and lowered between the truck frame 34 and the ground 44 on which the refuse truck 20 is positioned. For example, the pallet box support member 125 of the pallet jack box actuation assembly 120 is configured to be raised in the direction of arrow U (FIG. 3) providing the pallet jack box actuation system 100 with a raised configuration and to be lowered in the direction of arrow D (FIG. 2) providing the pallet jack box actuation system 100 with a lowered configuration.

The hydraulic cylinder 126 is disposed between and connects the top portion 122 and the bottom portion 124 of the pallet jack box actuation assembly 120. The hydraulic cylinder 126 includes a top cylinder portion 134 at a top end 128 and a bottom portion 136 at a bottom end 130. The bottom portion 136 of the hydraulic cylinder 126 is configured to extend from the top cylinder portion 134 of the hydraulic cylinder 126 in an extended position. For example, the bottom portion 136 of the hydraulic cylinder 126 extends in a downward diagonal direction 150 to reach the extended position. The bottom portion 136 of the hydraulic cylinder 126 is further configured to retract into the top cylinder portion 134 in a retracted position. For example, the bottom portion 136 retracts in an upward diagonal direction 154 (FIG. 3) to reach the retracted position. Thus, the bottom portion 136 is configured to extend between an extended position to place the pallet jack box actuation assembly 120 in an extended configuration and a retracted position to place the pallet jack box actuation assembly 120 in a retracted configuration. Further, in the extended configuration, the pallet jack box 102 is closer to the ground than in the retracted configuration.

Referring to FIG. 2, a linkage assembly 121 includes a top link 160 and a bottom link 162 that are compressed together in the retracted configuration when the pallet jack box actuation assembly 120 is in a raised position. In the raised position, the pallet jack box actuation assembly 120 is spaced from the ground 44 at a ground clearance 144, and the bottom portion 136 of the hydraulic cylinder 126 is in the retracted position.

Referring to FIG. 3, the top link 160 and the bottom link 162 are expanded away from each other in the extended configuration and are configured to be spaced from one another when the pallet jack actuation assembly 120 is in a lowered position. In the lowered position, the pallet jack actuation assembly 120 is seated on the ground 44, and the bottom portion 136 of the hydraulic cylinder 126 is in the extended position. Further, the pallet jack box 102 is spaced from the truck frame 34 by a vertical truck clearance 146 in the lowered position.

Further, due to the angled orientation of the hydraulic cylinder 126 and actuation direction 150, the pallet jack box 102 is spaced from the truck frame 34 by a lateral truck clearance 147 that is greater in the lowered position than in the raised position. Raising or lowering of the pallet jack box actuation assembly 120 may be controlled via a pallet jack box actuation assembly control mechanism 108 (FIG. 1), which may be activated in the form of an operator controllable button. For example, the hydraulic pallet jack box actuation system 100 may include a controller including a processor and a non-transitory computer-readable storage medium (such as memory) that stores instructions that, when executed by the processor, cause the processor to activate the hydraulic cylinder to control the raising and lowering of the pallet jack box actuation assembly 120 as described herein.

In other embodiments, the operation of the hydraulic cylinder 126 may be controlled directly by the control mechanism 108.

In embodiments, the hydraulic cylinder 126 may include a mechanical latch and a hydraulic check valve. When the mechanical latch and hydraulic check valve of the hydraulic cylinder 126 are in a locked condition, the pallet jack box actuation assembly 120 is configured to be secured to the truck frame 34 and spaced from the ground 44 in the raised position (FIGS. 1-2) and prevented from transitioning to the lowered position (FIG. 3).

In an embodiment, the system 100 may include a plurality of linkage arms 170 disposed between and attaching the top link 160 and the bottom link 162 of the linkage assembly 121. The linkage assembly 121 includes the top link 160, the bottom link 162, and the plurality of linkage arms 170. The plurality of linkage arms 170 may rotate in a clockwise direction 152 (FIG. 2) when the bottom portion 136 of the hydraulic cylinder 126 moves toward the extended position (FIG. 3). Alternatively, the plurality of linkage arms 170 may rotate in a counter-clockwise direction 156 (FIG. 3) when the bottom portion 136 of the hydraulic cylinder 126 moves toward the retracted position (FIG. 2).

The plurality of linkage arms 170 may include four linkage arms. For example, the plurality of linkage arms 170 may include a pair of linkage arms 170 positioned toward and disposed below the left side 29 of the cross member 33 and an opposing pair of linkage arms 170 positioned toward and disposed below the right side 31 of the cross member 33. Each linkage arm 170 may include a first pivot end 172 attached to the bottom link 162 of the linkage assembly 121 at a portion including the top portion 122 of the pallet jack box actuation assembly 120. Further, each linkage arm 170 may include a second pivot end 173 attached to the top link 160 of the linkage assembly 121 at a portion including the bottom portion 124 of the pallet jack box actuation assembly 120. A center of the first pivot end 172 and a center of the second pivot end 173 of each linkage arm 170 of the plurality of linkage arms 170 may be spaced from one another at a distance of between about 10 inches and about 30 inches, such as about 20 inches, which can be adjusted based, for example, on the height of the floor 24 and of the truck bed 22.

In embodiments, the bottom portion 136 of the hydraulic cylinder 126 is attached at a bottom connection point 131 to the pallet box support member 125 of the pallet jack box actuation assembly 120 via a bottom bracket 132. Further, the top cylinder portion 134 of the hydraulic cylinder 126 is attached at a top connection point 129 to the cross member 33 via a top bracket 35. A center of the top connection point 129 may be spaced from a center of the bottom connection point 131 in the extended position (FIG. 3) between about 40 inches and about 60 inches, such as about 48 inches, which can be adjusted based, for example, on the height of the floor 24 of the truck bed 22. The center of the top connection point 129 may be spaced from a center of the bottom connection point 131 in the retracted position (FIG. 2) between about 20 inches and about 40 inches, such as about 28 inches, which can be adjusted based, for example, on the height of the floor 24 of the truck bed 22.

Referring also to FIG. 1, the pallet jack box 102 may include a top wall 110, a bottom wall 116, a door 112, an inner rear end facing wall 111, an outer rear end facing wall 115, and a front end facing wall 114. The inner rear end facing wall 111 is connected to the outer rear end facing wall 115 through a connecting intermediate wall 113. As a non-limiting example, the connecting intermediate wall 113 slopes upward between the inner rear end facing wall 111 and the outer rear end facing wall 115.

Referring particularly to FIG. 1, a space defined between the top wall 110, the inner rear end facing wall 111, the outer rear end facing wall 115, and the connecting intermediate wall 113 is configured to contain a rotatable arm 202 of the pallet jack 104 that is to be contained within the pallet jack box 102. A body 204 of the pallet jack 104 is configured to be contained in an interior space defined between the inner rear end facing wall 111, the front end facing wall 114, the bottom wall 116, and the top wall 110 of the pallet jack box 102.

Figure 4:
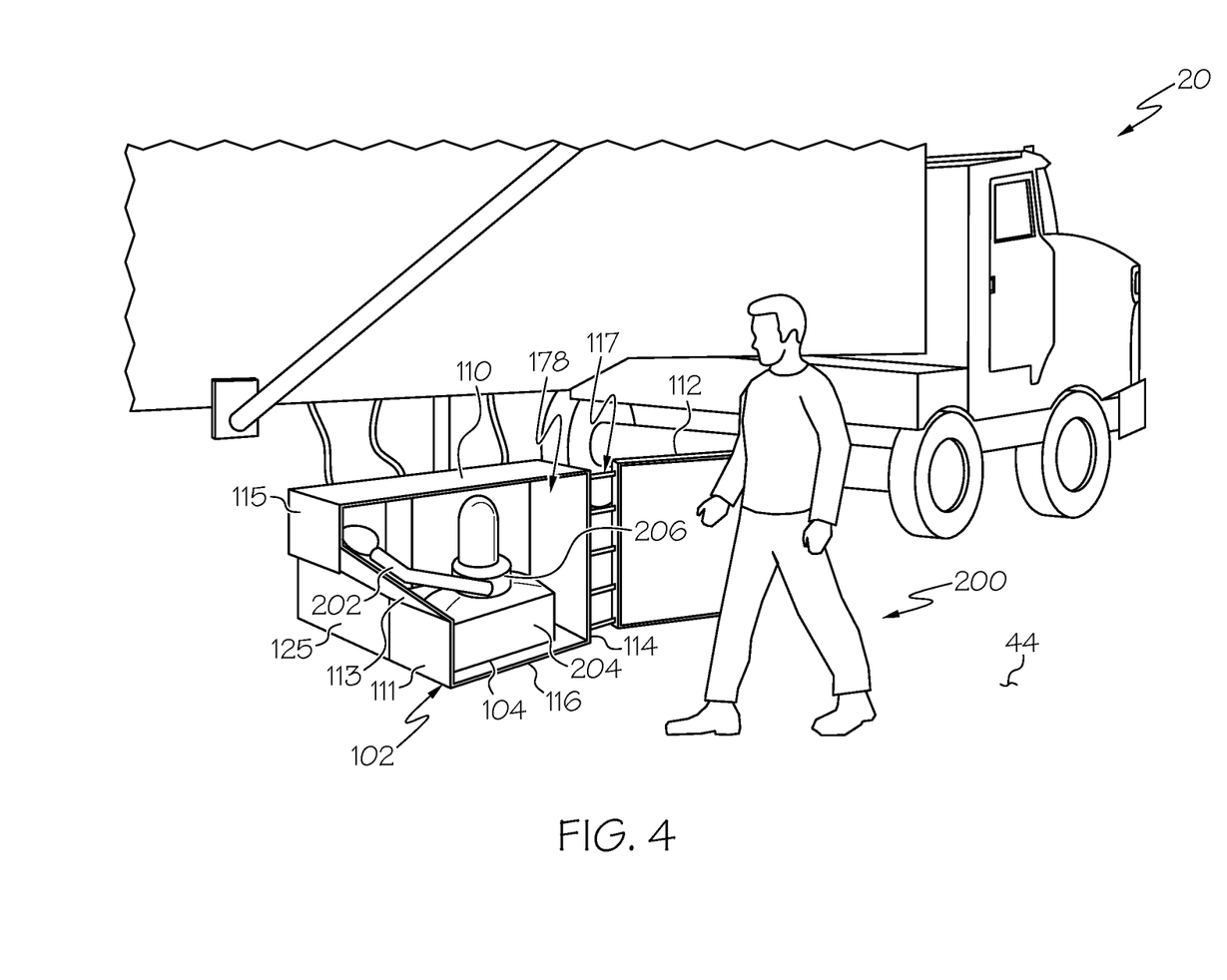
FIG. 4 schematically illustrates an isometric side view of the hydraulic pallet jack box actuation system of FIG. 1 in the lowered position with a door opened and the pallet jack in a fully contained position, according to one or more embodiments shown and described herein.
Figure 5:
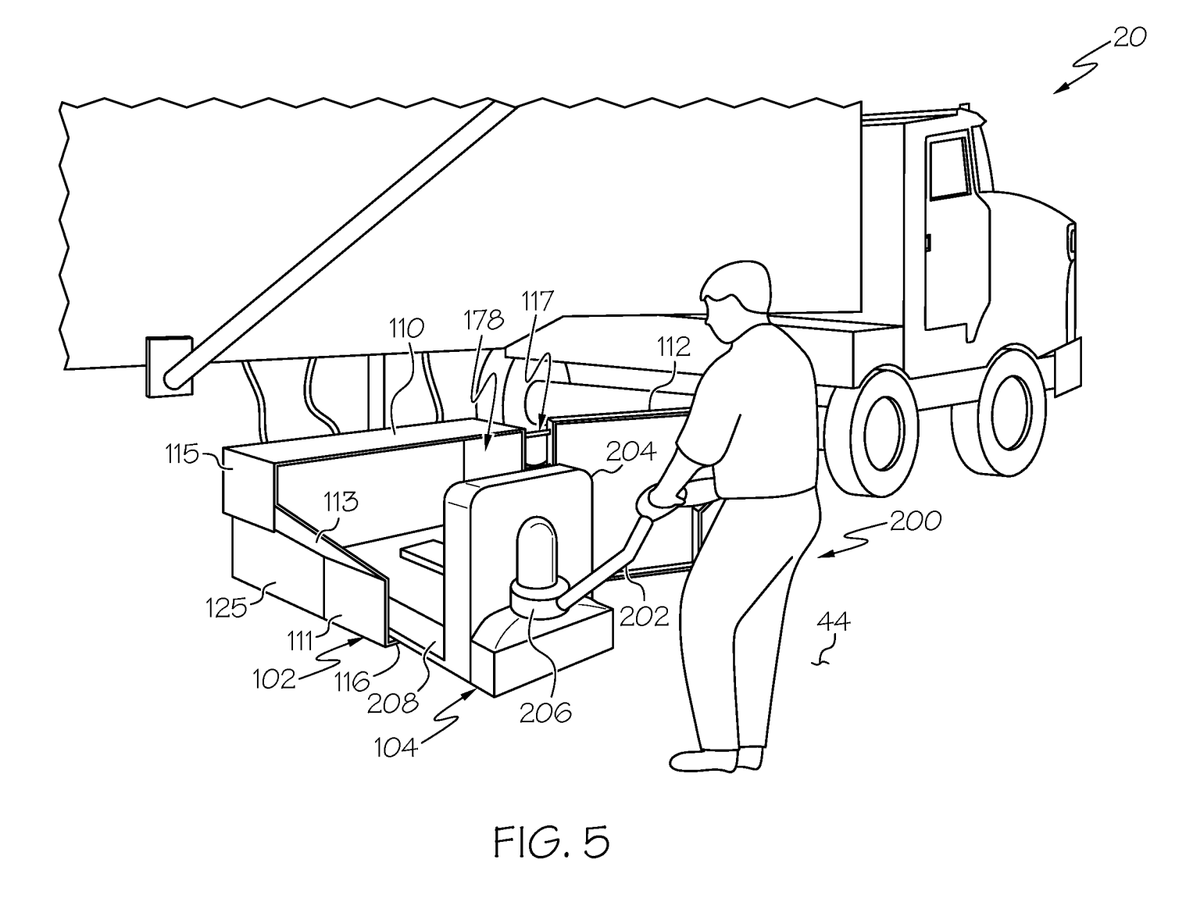
FIG. 5 schematically illustrates the pallet jack of FIG. 4 in a partially contained position, according to one or more embodiments shown and described herein.
Figure 6:
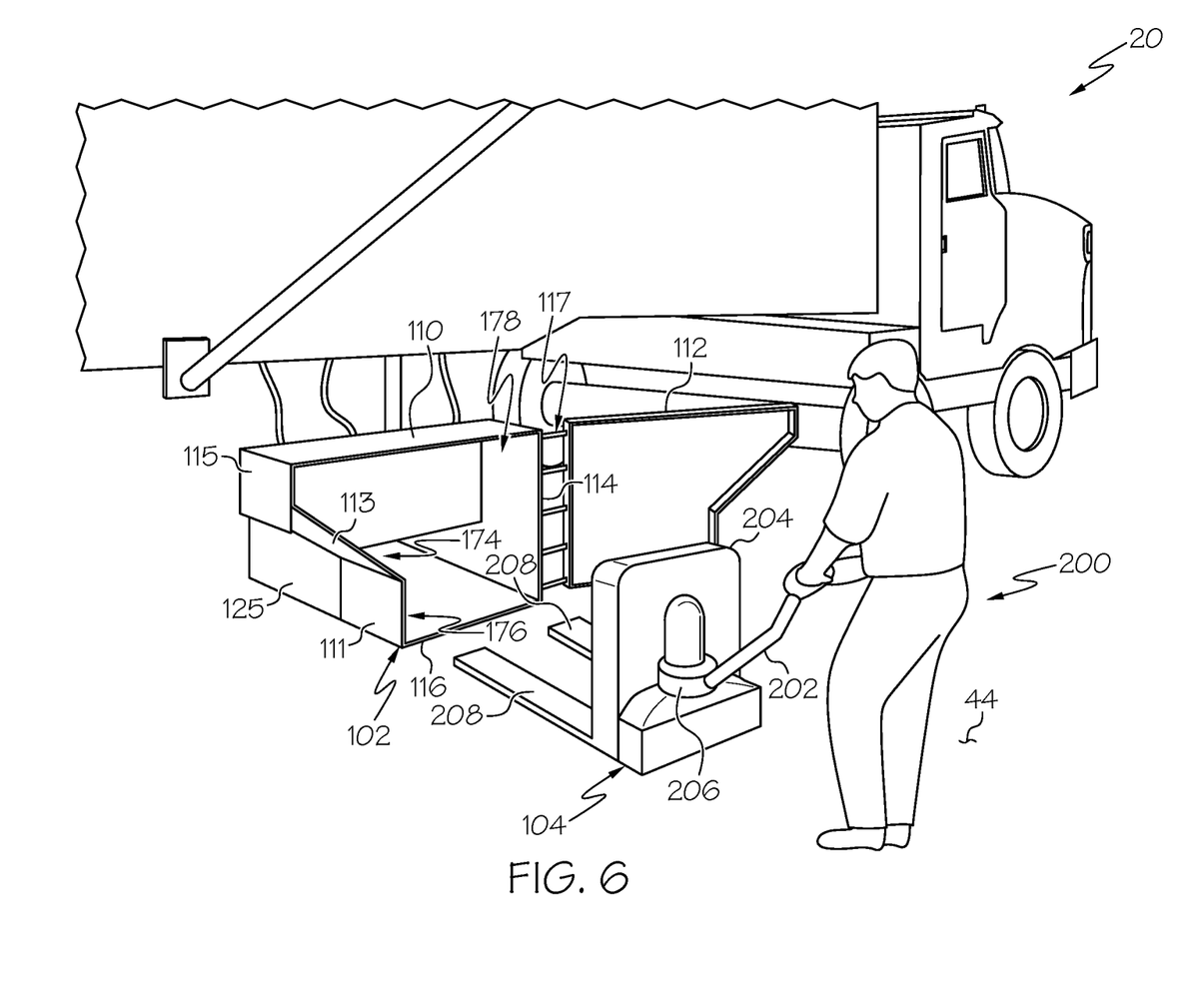
FIG. 6 schematically illustrates the pallet jack of FIG. 4 in a separated position, according to one or more embodiments shown and described herein.

The front end facing wall 114 may be secured to the door 112 through, for example, one or more door hinges 117 (FIG. 4) such that the door 112 is openable and closeable. The pallet jack box 102 may include a locking mechanism 106 configured to, in a locking mode, secure edges of the door 112 and edges of the inner rear end facing wall 111, the connecting intermediate wall 113, and the outer rear end facing wall 115 such that the pallet jack box 102 is in a closed door position. For example, such a closed door position is illustrated in FIG. 1. The locking mechanism 106 may be configured to, in an unlocking mode, release the edges of the door 112 and the edges of the inner rear end facing wall 111, the connecting intermediate wall 113, and the outer rear end facing wall 115 to allow the door 112 to pivot away from the walls 111, 113, 115 about the door hinges 117 and toward the front end facing wall 114 in an opened door position. For example, such an opened door position is illustrated in FIGS. 4-6. The pallet jack box 102 may include more than one locking mechanism 106.

Referring to FIGS. 4-6, the pallet jack 104 is contained by pallet jack box 102. An operator 200 may open a door of the pallet jack box 102 to place the pallet jack box 102 in the opened door position. In a fully contained position, as shown in FIGS. 1 and 4, the pallet jack 104 is positioned in the pallet jack box 102 such that the rotatable arm 202 is contained in the space defined between the top wall 110, the inner rear end facing wall 111, the outer rear end facing wall 115, and the connecting intermediate wall 113. The body 204, including a pivot portion 206, is disposed in the interior space defined between the inner rear end facing wall 111, the front end facing wall 114, the bottom wall 116, and the top wall 110 of the pallet jack box 102 in the fully contained position. The rotatable arm 202 is rotatably connected to the body 204 of the pallet jack 104 through the pivot portion 206.

In a partially contained position, as shown in FIG. 5, an operator 200 rotates the rotatable arm 202 about the pivot portion 206 such that the operator 200 is able to generally align the rotatable arm 202 with a pair of forks 208 and begin to pull the pallet jack 104 from the pallet jack box 102. In the fully contained position or the partially contained position, at least a portion of the pair of forks 208 are contained within the pallet box support member 125 of the pallet jack box actuation assembly 120. Alternatively, the operator 200 may push the pallet jack 104 into the pallet jack box 102 to transition back from the partially contained position to the fully contained position.

In a separated position, as shown in FIG. 6, the pallet jack 104 is completely removed from the pallet jack box 102 such that the pair of forks 208 are spaced from the pallet box support member 125 of the pallet jack box actuation assembly 120. For example, the operator 200 may pull the pallet jack 104 from the pallet jack box 102 when transitioning from the partially contained position to the separated position. Alternatively, the operator 200 may push the pallet jack 104 into the pallet jack box 102 when transitioning from the separated position to the partially contained position.

In an embodiment, a method of assembling the hydraulic pallet jack box actuation system 100 for the refuse truck 20 may include attaching a top end of the linkage connection portion 123 of the pallet jack box actuation assembly 120 to the cross member 33 of the truck frame 34 of the refuse truck 20. For example, the top end of the linkage connection portion 123 may be welded, bolted, or otherwise fastened to the cross member 33. Further, a bottom link 162 of the linkage connection portion 123 is configured to be pivotally connected to the first pivot end 172 of each of a plurality of linkage arms 170. The top portion 122 is configured to be statically fixed in position with respect to the truck frame 34 as the bottom portion 124 of the pallet jack box actuation assembly 120 is raised or lowered with respect to the truck frame 34 and the top portion 122.

The method may further include attaching a top end of the top cylinder portion 134 of the hydraulic cylinder 126 to the top bracket 35 of the cross member 33. As described herein, the bottom portion 136 of the hydraulic cylinder 126 may be configured to retract into and extend from the top cylinder portion 134. A bottom end of the bottom portion 136 of the hydraulic cylinder 126 may be attached to the bottom bracket 132 of the bottom portion 124 of the pallet jack box actuation assembly 120. The top link 160 of the bottom portion 124 is configured to be pivotally connected to the second pivot end 173 of each of the plurality of linkage arms 170. In embodiments, the pallet jack box 102, which is configured to contain the pallet jack 104, is supported by and attachable to the pallet box support member 125 of the bottom portion 124 of the pallet jack box actuation assembly 120. Further, the bottom portion 124 of the pallet jack box actuation assembly 120 upon which the pallet jack box 102 may be supported is configured to dynamically raise or lower with respect to the top portion 122 of the pallet jack box actuation assembly 120, as described herein. Simultaneously, the pallet jack box 102 supported by the pallet jack box actuation assembly 120 will be raised or lowered with respect to the ground 44. In embodiments, the pallet jack box 102 may be attached to the pallet jack box actuation assembly 120 through, for example, welding, bolts, or a like fastening.

As an example and not a limitation, a method of raising and lowering the hydraulic pallet jack box actuation system 100 for the refuse truck 20 includes, as illustrated in FIG. 2, abutting the bottom link 162 of the bottom portion 124 connected to the linkage connection portion 123 of the top portion 122 of the pallet jack box actuation assembly 120 against the top link 160 of the top portion 122 of the pallet jack box actuation assembly 120 in a first, raised position. The bottom link 162 and the top link 160 form a portion of the linkage assembly 121. The method further includes, as illustrated in FIG. 3, spacing the bottom link 162 of the linkage assembly 121 from the top link 160 of the linkage assembly 121 in a second, lowered position. Additionally, the top portion 122 is connected to the bottom portion 124 of the pallet jack box actuation assembly 120 via the hydraulic cylinder 126. The hydraulic cylinder 126 is used, for example, through the pallet jack box actuation assembly control mechanism 108, to at least one of dynamically raise and lower the bottom portion 124 with respect to the top portion 122 between the first, raised position (FIG. 2) and the second, lowered position (FIG. 3).

The top portion 122 of the pallet jack actuation assembly 120 may be connected to the bottom portion 124 of the pallet jack actuation assembly 120 via a plurality of linkage arms 170, which may be a part of the linkage assembly 121 along with the top link 160 and the bottom link 162. The plurality of linkage arms 170 may pivot when the bottom portion 124 is raised or lowered with respect to the top portion 122. For example, when the hydraulic cylinder 126 is transitioning the hydraulic pallet jack box actuation system 100 between the first, raised position (FIG. 2) and the second, lowered position (FIG. 3), the plurality of linkage arms 170 rotate in the clockwise direction 152. Alternatively, when the hydraulic cylinder 126 is transitioning the hydraulic pallet jack box actuation system 100 between the second, lowered position (FIG. 3) and the first, raised position (FIG. 2), the plurality of linkage arms 170 rotate in a counter-clockwise direction 156.

Embodiments of the hydraulic pallet jack box actuation systems 100 as described herein thus permit for a raising and/or lowering of a pallet jack box actuation assembly 120 that is attached to the refuse truck 20 for reliable transport of pallet jack components with greater ease and efficiency than conventional systems with respect to pallet jacks 104 transported by the refuse truck 20. For example, through use of the systems 100 as described herein, additional discrete components requiring labor-intensive, manual loading or removal, such as a ramp system, would not be required to load or remove the one or more pallet jacks 104 onto or from the refuse truck 20 for transport and/or operator use.

Further, the locking mechanisms of the systems 100 would prevent the pallet jack box actuation assembly 120 from lowering during transport of the pallet jack actuation assemblies 120 by the refuse truck 20. For example, an operator may drive the refuse truck 20 with the pallet jack actuation assembly 120 in a securely raised position that maintains the ground clearance 144 throughout transit while preventing the bottom portion 124 from releasing from the top portion 122 of the pallet jack actuation assembly 120. Further, locking mechanisms 106 on the pallet jack box 102 similarly permit a secured containment during transport of the one or more pallet jacks 104 by the refuse truck 20.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hydraulic pallet jack box actuation system for a refuse truck, the hydraulic pallet jack box actuation system comprising:
    a pallet jack box actuation assembly;
    a pallet jack box supported by the pallet jack box actuation assembly and sized and configured to contain at least a portion of a pallet jack, wherein the pallet jack box comprises a top wall, a bottom wall, a door, an inner rear end facing wall, an outer rear end facing wall, and a front end facing wall, the inner rear end facing wall is connected to the outer rear end facing wall through a connecting intermediate wall, and the connecting intermediate wall slopes upward between the inner rear end facing wall and the outer rear end facing wall;
    wherein the pallet jack box actuation assembly comprises:
        a top portion comprising a linkage connection portion that connects to a cross member of a truck frame of the refuse truck;
        a bottom portion comprising a pallet box support member configured to be raised and lowered between the truck frame and a ground on which the refuse truck is positioned;
        a hydraulic cylinder disposed between and connecting the top portion and the bottom portion, the hydraulic cylinder comprising a top cylinder portion and a bottom portion configured to extend between an extended position to place the pallet jack box actuation assembly in an extended configuration and a retracted position to place the pallet jack box actuation assembly in a retracted configuration;
        wherein, in the extended configuration, the pallet jack box is closer to the ground than in the retracted configuration.

2. The hydraulic pallet jack box actuation system of claim 1, further comprising a plurality of linkage arms disposed between and attaching a top link of the top portion and a bottom link of the bottom portion of the pallet jack box actuation assembly, wherein the top link, the bottom link, and the plurality of linkage arms comprise a linkage assembly.

3. The hydraulic pallet jack box actuation system of claim 2, wherein the plurality of linkage arms rotate in a clockwise direction when the bottom portion moves toward the extended position.

4. The hydraulic pallet jack box actuation system of claim 2, wherein the plurality of linkage arms rotate in a counter-clockwise direction when the pallet box support member moves toward the retracted position.

5. The hydraulic pallet jack box actuation system of claim 1, wherein the bottom portion of the hydraulic cylinder is attached at a bottom connection point to the bottom portion via a bottom bracket.

6. The hydraulic pallet jack box actuation system of claim 1, wherein the top cylinder portion of the hydraulic cylinder is attached at a top connection point to the cross member of the top portion via a top bracket.

7. The hydraulic pallet jack box actuation system of claim 1, wherein a space defined between the top wall, the inner rear end facing wall, the outer rear end facing wall, and the connecting intermediate wall is configured to contain a rotatable arm of the pallet jack to be contained within the pallet jack box.

8. The hydraulic pallet jack box actuation system of claim 1, wherein a body of the pallet jack is configured to be contained in an interior space defined between the inner rear end facing wall, the front end facing wall, the bottom wall, and the top wall.

9. A method of assembling a hydraulic pallet jack box actuation system for a refuse truck, the method comprising:
    attaching a top end of a linkage connection portion of a pallet jack box actuation assembly to a cross member of a truck frame of the refuse truck, wherein:
        a bottom link of the linkage connection portion is configured to be pivotally connected to a first pivot end of each of a plurality of linkage arms, a top portion of the pallet jack box actuation assembly attachable to the cross member includes the linkage connection portion, and the top portion is configured to be statically fixed in position with respect to the truck frame;

attaching a top end of a top cylinder portion of a hydraulic cylinder to a top bracket of the cross member, wherein a bottom portion of the hydraulic cylinder is configured to retract into and extend from the top cylinder portion;

attaching a bottom end of the bottom portion of the hydraulic cylinder to a bottom bracket of a bottom portion of the pallet jack box actuation assembly, wherein:

a top link of the bottom portion is configured to be pivotally connected to a second pivot end of each of the plurality of linkage arms, and a pallet box support member of the bottom portion of the pallet jack box actuation assembly is configured to dynamically raise or lower with respect to the top portion of the pallet jack box actuation assembly; and attaching a pallet jack box configured to contain a pallet jack to the pallet jack box actuation assembly, wherein the pallet jack box comprises a top wall, a bottom wall, a door, an inner rear end facing wall, an outer rear end facing wall, and a front end facing wall, the inner rear end facing wall is connected to the outer rear end facing wall through a connecting intermediate wall, and the connecting intermediate wall slopes upward between the inner rear end facing wall and the outer rear end facing wall.

10. A method of raising and lowering a hydraulic pallet jack box actuation system for a refuse truck, the method comprising:

abutting a bottom link of a bottom portion connected to a linkage connection portion of a top portion of a pallet jack box actuation assembly against a top link of a top portion of the pallet jack box actuation assembly in a first, raised position, wherein the bottom link and the top link are part of a linkage assembly, wherein a pallet jack box is supported by the pallet jack box actuation assembly and is sized and configured to contain at least a portion of a pallet jack, wherein the pallet jack box comprises a top wall, a bottom wall, a door, an inner rear end facing wall, an outer rear end facing wall, and a front end facing wall, the inner rear end facing wall is connected to the outer rear end facing wall through a connecting intermediate wall, and the connecting intermediate wall slopes upward between the inner rear end facing wall and the outer rear end facing wall;

spacing the bottom link from the top link of the linkage assembly in a second, lowered position through use of a hydraulic cylinder, wherein the hydraulic cylinder is configured to connect the top portion to the bottom portion of the pallet jack box actuation assembly and to at least one of dynamically raise and lower the bottom portion with respect to the top portion between the first, raised position and the second, lowered position.

11. The method of claim 10, wherein:

a plurality of linkage arms are attached between the top link and the bottom link of the linkage assembly to connect the top portion to the bottom portion of the pallet jack box actuation assembly.

12. The method of claim 11, wherein, when the hydraulic cylinder is transitioning between the first, raised position and the second, lowered position, the plurality of linkage arms rotate in a clockwise direction.

13. The method of claim 11, wherein, when the hydraulic cylinder is transitioning between the second, lowered position and the first, raised position, the plurality of linkage arms rotate in a counter-clockwise direction.

* * * * *